United States Patent [19]

Kitai et al.

[11] 4,267,440
[45] May 12, 1981

[54] FOCUS DETECTING SYSTEM

[75] Inventors: Kiyoshi Kitai; Shinji Nagaoka; Yuzuru Takazawa, all of Shikawatashi, Japan

[73] Assignee: Seiko Koki Kabushiki Kaisha, Tokyo, Japan

[21] Appl. No.: 24,440

[22] Filed: Mar. 27, 1979

[30] Foreign Application Priority Data

Apr. 12, 1978 [JP] Japan ................... 53-42997

[51] Int. Cl.³ .............................................. G01J 1/20
[52] U.S. Cl. ....................................... 250/201; 354/25
[58] Field of Search ............... 250/201, 204, 216, 578; 354/25; 356/4, 5

[56] References Cited

U.S. PATENT DOCUMENTS

| 3,762,294 | 10/1973 | Kosaka et al. | 354/25 |
| 4,083,056 | 4/1978 | Nakamura et al. | 354/25 |
| 4,178,098 | 12/1979 | Asano et al. | 250/201 |
| 4,183,640 | 1/1980 | Abe | 250/204 |

Primary Examiner—David C. Nelms
Attorney, Agent, or Firm—Robert E. Burns; Emmanuel J. Lobato; Bruce L. Adams

[57] ABSTRACT

The system is provided with an optical means capable of forming images obtained through a first light passage and a second light passage. A light detecting system is formed of a plurality of light responsive elements which receive the image. A focus detection signal is obtained by detecting the differential between the maximum and the minimum intensity of the light pattern or the maximum ratio of the maximum intensity to the minimum intensity using the electric output of the light responsive elements corresponding the light pattern of a composite image.

5 Claims, 6 Drawing Figures

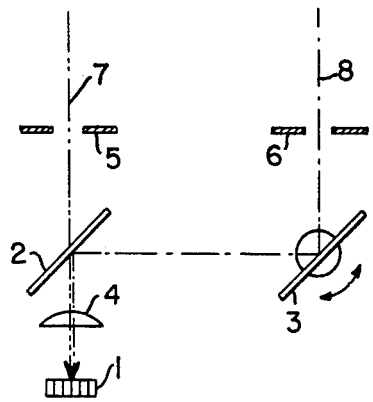
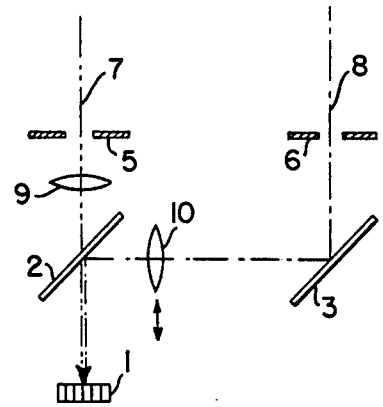
FIG. 1(a)          FIG. 1(b)
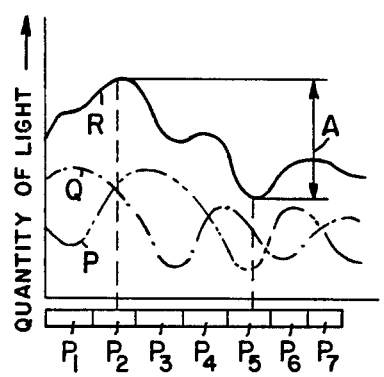
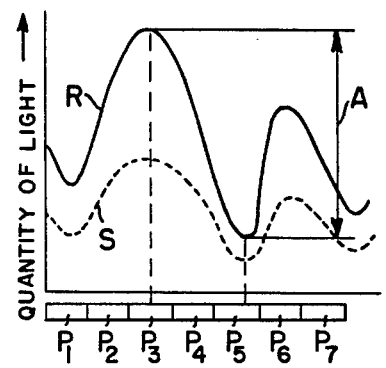
FIG. 2(a)          FIG. 2(b)

FOCUS DETECTING SYSTEM

BACKGROUND OF THE INVENTION

The field of art to which the present invention pertains includes a focus detecting system capable of computing the object distance.

The prior art to which the present invention is directed includes the focus detecting system of the type capable of detecting the object distance by comparing the image patterns obtained through two separate light passages through electrically processing the signal obtained by receiving light through two separate light passages on a pair of groups of light responsive elements provided adjacently with each other on a wafer of semiconductor.

The conventional focus detecting system of this type requires a complicated optical structure for guiding light through two separate light passages to two separate groups of light responsive elements provided adjacently with each other on a face of a wafer of semiconductor. Furthermore, the wafer of semiconductor composing a unit of light responsive elements is costly when two separate groups of light responsive elements are required. Still further, the accuracy of the conventional system of this type in focus detection is not satisfactory because the difference in the sensitivity between the groups of light responsive elements or the difference in the amplification of the amplifiers affects the accuracy disadvantageously as the image patterns obtained through two separate light passages are compared with each other by means of two sets of groups of light responsive elements.

SUMMARY OF THE INVENTION

Accordingly, an object of the present invention is to overcome those disadvantages as hereinbefore described.

This invention provides a focus detecting system having an optical means capable of forming images obtained through a first light passage and a second light passages, and a light detecting system formed of a plurality of light responsive elements which receive a composite image formed by the optical means, wherein a focus detection signal is obtained by detecting the light pattern of the composite image generated by the light detecting system.

And the invention also provides a focus detecting system capable of generating a focus detection signal by detecting the light pattern of the images by means of the light responsive elements, then computing a differential between the maximum and the minimum intensities of the light pattern or the maximum ratio of the maximum intensity to the minimum intensity.

BRIEF DESCRIPTION OF THE DRAWING

FIGS. 1a and 1b show a preferred embodiment of the optical system applied to the focus detecting system according to the present invention.

FIGS. 2a and 2b are diagrams illustrating patterns of incident light quantity received by groups of light responsive elements where FIG. 2a illustrates the images obtained through two separate light passages that are in disagreement while FIG. 2b illustrates the images in agreement.

DETAILED DESCRIPTION

Figure 3:
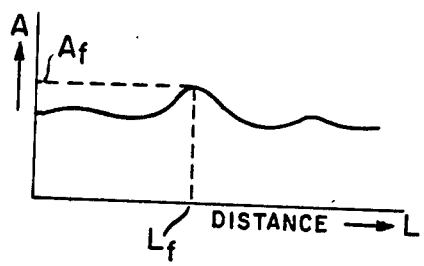
FIG. 3 is a waveform diagram illustrating the output of the detecting circuit of the present invention.

Explanation will be made of a preferred embodiment of the present invention referring to the attached drawings.

Referring first to FIG. 1a illustrating a system including a movable mirror (3), wherein reference numerals indicate 1: groups of light responsive elements, 2: a half-mirror, 4: a condenser lens, 5 and 6: slits, 7: an optical axis representing a first light path or passage, and 8: an optical axis representing a second light path or passage.

The light by way of the first light passage, passes through the slit (5) and the half-mirror (2) successively and is focused on the group of the light responsive elements (1) by the condenser lens (4), while the light by way of the second light passage, is limited by the slit (6), reflected by the movable mirror (3), then a part of the light is reflected by the half-mirror (2) and focused on the group of the light responsive elements (1) by the condenser lens (4). The movable mirror (3) can be turned as shown by the arrows so that the image focused on the light responsive elements (1) changes from the image of an object at the nearest range to the image of an object at an infinite range according to the scanning operation of the movable mirror (3). Thus the image obtained by way of the first light passage, i.e., a fixed light passage, and the image obtained by way of the second light passage, i.e., a movable or variable light passage, are incident on the light responsive elements to form a composite image pattern.

FIG. 1b illustrates an optical system provided with a movable condenser lens (10) instead of the movable mirror (3) of the optical system illustrated by FIG. 1a. The movable lens (10) can be shifted as shown by the arrows so that the image brought into focus on the light responsive elements (1) through the light path having optical axis (8) is changed from the image of an object at the nearest range to the image of an object at an infinite range. The lens (9) is disposed on the optical axis (7) to provide the same condition with that of the optical axis (8) as the lens (10) is disposed on the optical axis (8). In this system, similarly to the system described referring to FIG. 1a, a composite image is focused on the light responsive elements (1). The described optical systems represent the preferred form of the present invention, however, it is to be understood that it is subject to modification, for example, optical prisms are applicable to form an equivalent optical system.

FIGS. 2a and 2b are diagrams illustrating patterns of incident light received by the light responsive elements to facilitate explanation on the operation of the system. FIG. 2a illustrates a light pattern when the images obtained through two separate light paths or passages are in disagreement. P1, P2, ... and Pn represent the light responsive elements. The diagrams indicated by P and Q represent light quantity patterns of images obtained through the first and the second light passages, respectively. In FIG. 2a, P and Q are shifted with each other in the direction of the arrangement of the light responsive elements. In practice, a light quantity pattern R, produced by adding up the light quantity patterns P and Q, is focused on the light responsive elements. In FIG. 2a, the light responsive elements P2 and P5 are receiving the most and the least light quantity, respectively, to provide a light quantity differential of A which is smaller when the images obtained through the two separate light passages are in disagreement. FIG. 2b illustrates the images obtained through the two separate light passages in agreement wherein both light quantity patterns of images obtained through the first and the second light passages are illustrated by a light quantity pattern S. Consequently, the composite light quantity pattern shows waveform R twice as large as S. The light responsive elements P3 and P5 are receiving the most and the least light quantity, respectively, and the differential A between the most and the least light quantity is larger compared with the differential produced in the case when the images obtained through the two separate light passages are in disagreement.

In the diagram of FIG. 3, the x-axis and the y-axis represent a distance L of the focused object whose image is incident through the second light passage and the light quantity differential A, respectively. L varies according to the turning of the movable mirror (3) or the shifting of the movable lens (10) of FIG. 1. The differential A is smaller when the images obtained through the two separate light passages are in disagreement while the differential A shows the largest value when those images are in agreement. In FIG. 3, the differential A shows the largest value with the distance Lf indicating that the object distance is Lf. Outputs of the light responsive elements are processed by being converted into electric signals corresponding to the incident light quantity, for instance, short circuit current is determined in proportion to the incident light. In practice, the system is composed employing the fact that the differential between the largest and the smallest output signals of the light responsive elements shows the maximum value when the images obtained through the two separate light passages are in agreement. The agreement of those images can be recognized by computing the ratio of the largest output signal to the smallest output signal. In adjusting the photographic lens to a focus matching position corresponding to the object distance Lf, first the differential between the largest and the smallest output signals, corresponding to the most and the least light quantity received by the light responsive elements, i.e., an output signal corresponding to Af of FIG. 3 is memorized, then the movable mirror (3) or the movable lens (10) is operated again in the same direction with the movable mirror (3) or the movable lens (10) interlocked with the photographic lens, and when an output signal equivalent to the memorized output signal is obtained, the photographic lens is stopped. A variety of focus adjusting devices have been provided and the maximum output signal Af for the object distance Lf is applicable to any conventional focus adjusting device.

Figure 4:
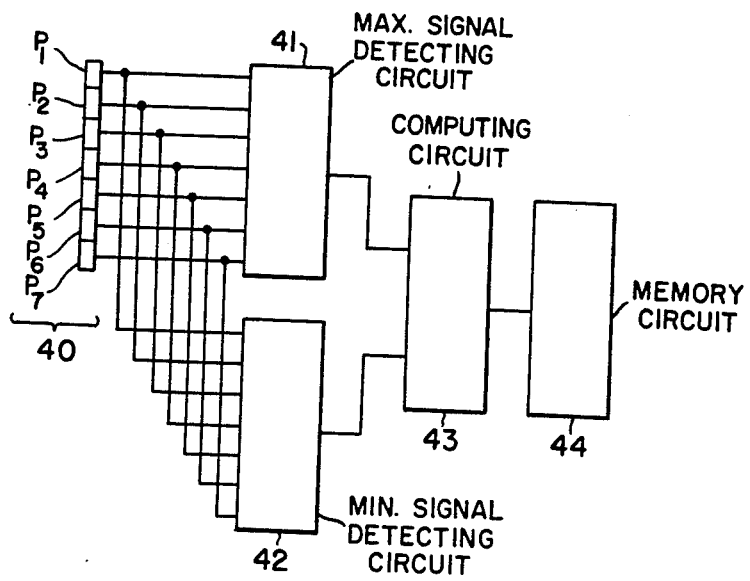
FIG. 4 is a schematic presentation in block form of an example of the detection circuit for the focus detecting system according to the present invention.

FIG. 4 illustrates a part of the focus detecting circuit in the form of a block diagram. A group of light responsive elements (40) comprises a plurality of light responsive elements P1, P2, . . . and Pn. A maximum signal detecting circuit (41) detects continuously the outputs of the light responsive elements and compares them to pick-up the maximum output signal. A minimum signal detecting circuit (42) detects continuously the outputs of the light responsive elements and compares them to pick-up the minimum output signal. A computing circuit (43) computes the differential between the outputs of the maximum signal detecting circuit and the minimum signal detecting circuit. The computing circuit (43) may be a circuit to compute the ratio of the maximum to the minimum output signal. A memory circuit (44) memorizes the maximum value of the output of the computing circuit (43). The system composed of these circuits converts the composite image, obtained by forming the images obtained through the two separate light passages, into electric signals by the light responsive elements, detects the maximum and the minimum output signal of the light responsive elements continuously, and memorizes the maximum differential or the maximum ratio between the maximum and the minimum output signal as a focus matching position. As mentioned hereinbefore, the photographic lens can be adjusted to a desired position by any known means using the output signal of the present invention. The system of the detecting circuit is not limited to the structure shown in FIG. 4.

The described invention provides a focus detecting system of a simplified structure requiring no complicated optical means which has been necessary for the conventional focus detecting systems as the focus detecting system according to the present invention provides a focus detection signal by receiving with a single group of light responsive elements a composite image obtained by forming images obtained through two separate light passages and detecting a light pattern of the composite image produced on the light responsive elements. Furthermore, the focus detecting system according to the present invention has the advantages that the size of the semiconductor wafer can be reduced compared with the conventional systems which require two sets of light responsive elements as a single set of light responsive elements is used for the focus detection, and also variation of specific characteristics between the light responsive elements is reduced.

We claim:
1. A focus detecting system, comprising:
a plurality of light responsive elements arranged in a single array for generating a plurality of electrical output signals in response to light incident thereon;
first image forming means having a light path for forming a light image on said array of light responsive elements;
second image forming means having an adjustable light path for forming a second light image on said array of light responsive elements, wherein the adjustable light path of said second image forming means is a different light path than the light path of said first image forming means and is adjustable for changing the second light image formed on said array of light responsive elements; and
detecting means receptive of and responsive to the plurality of electrical output signals from said array of light responsive elements for detecting when the first and second light images respectively formed by said first and second image forming means on said array of light responsive elements are the same.

2. A focus detecting system as set forth in claim 1, wherein said detecting means comprises means for computing a difference between the maximum output signal and the minimum output signal from said array of light responsive elements.

3. A focus detecting system as set forth in claim 1, wherein said detecting means comprises means for computing the maximum value of a ratio between the maximum output signal and the minimum output signal from said array of light responsive elements.

4. A focus detecting system as set forth in claim 1, 2 or 3, wherein: said first image forming means and said second image forming means both include a half-mirror for combining light traveling along the respective light paths of said first and second image forming means and for directing the combined light to strike said array of light responsive elements to form the first and second images therein; and wherein said second image forming means includes a movable optical element disposed in the light path of said second image forming means and movable for adjusting the light path of said second image forming means.

5. A focus detecting system as set forth in claim 1, 2 or 3, wherein said detecting means is comprised of: a maximum signal detecting circuit simultaneously and continuously receiving all of the output signals of said array of light responsive elements for detecting the maximum output signal from said array of light responsive elements; a minimum signal detecting circuit simultaneously and continuously receiving all of the output signals of said array of light responsive elements for detecting the maximum output signal from said array of light responsive elements; a computing circuit receptive of the detected maximum signal and the detected minimum signal for computing when the detected maximum and minimum signals correspond to the first and second images coinciding; and a memory circuit for memorizing a value computed by said computing circuit when the detected maximum and minimum signals correspond to the first and second images coinciding.

* * * * *